(12) United States Patent
Garrett et al.

(10) Patent No.: US 10,946,320 B2
(45) Date of Patent: Mar. 16, 2021

(54) OIL SEPARATING DEVICE

(71) Applicant: Nifco Inc., Yokosuka (JP)

(72) Inventors: Stephen Garrett, Stockton-on-Tees (GB); Alex Inglis, Stockton-on-Tees (GB)

(73) Assignee: NIFCO INC., Yokosuka (JP)

( * ) Notice: Subject to any disclaimer, the term of this patent is extended or adjusted under 35 U.S.C. 154(b) by 134 days.

(21) Appl. No.: 16/321,365

(22) PCT Filed: Aug. 10, 2017

(86) PCT No.: PCT/JP2017/029123
§ 371 (c)(1),
(2) Date: Jan. 28, 2019

(87) PCT Pub. No.: WO2018/034235
PCT Pub. Date: Feb. 22, 2018

(65) Prior Publication Data
US 2019/0168146 A1 Jun. 6, 2019

(30) Foreign Application Priority Data
Aug. 17, 2016 (GB) ..................... 1614108

(51) Int. Cl.
*B01D 45/00* (2006.01)
*B01D 45/08* (2006.01)
(Continued)

(52) U.S. Cl.
CPC .......... *B01D 45/08* (2013.01); *B01D 46/003* (2013.01); *B01D 50/002* (2013.01);
(Continued)

(58) Field of Classification Search
CPC .... B01D 45/08; B01D 46/003; B01D 50/002; B01D 39/083; F01M 13/0405;
(Continued)

(56) References Cited

U.S. PATENT DOCUMENTS 4,627,406 A * 12/1986 Namiki .................. F02M 25/06
123/573
6,101,886 A * 8/2000 Brenizer ................ B01D 45/08
55/308

(Continued)

FOREIGN PATENT DOCUMENTS

JP S5965713 U 5/1984
JP H0947617 A 2/1997
(Continued)

OTHER PUBLICATIONS

Notification of Reasons for Refusal for Japanese Patent Application No. 2018-516088, dated Mar. 12, 2019, 7 pages.
(Continued)

*Primary Examiner* — Dung H Bui
(74) *Attorney, Agent, or Firm* — Armstrong Teasdale LLP

(57) ABSTRACT

An oil separating device for separating an oil mist from a blow-by gas is arranged on a flow passage of the blow-by gas. The oil separating device includes an oil separator having an inlet formed at one end thereof and an outlet formed at another end thereof opposite to the one end; a collision wall arranged at a downstream side of the oil separator, and including an uneven portion formed on a surface thereof to face the outlet of the oil separator; and a filter arranged between the oil separator and collision wall. The oil separator is formed such that the oil mist in the blow-by gas coalesces together to form a coalesced oil mist, the filter removes the coalesced oil mist from the blow-by gas, and the collision wall separates a remained oil mist remained in the blow-by gas through the filter.

2 Claims, 8 Drawing Sheets

(51) Int. Cl.
  *F01M 13/04* (2006.01)
  *B01D 46/00* (2006.01)
  *B01D 50/00* (2006.01)
  *F01M 13/00* (2006.01)
  *B01D 39/08* (2006.01)

(52) U.S. Cl.
  CPC ....... *F01M 13/0405* (2013.01); *B01D 39/083* (2013.01); *F01M 13/04* (2013.01); *F01M 2013/005* (2013.01); *F01M 2013/0427* (2013.01); *F01M 2013/0433* (2013.01); *F01M 2013/0438* (2013.01); *F01M 2013/0461* (2013.01)

(58) Field of Classification Search
  CPC ..... F01M 2013/005; F01M 2013/0427; F01M 2013/0433; F01M 2013/0461; F01M 2013/0438; F01M 13/04
  See application file for complete search history.

(56) References Cited

U.S. PATENT DOCUMENTS

| | | | |
|---|---|---|---|
| 9,938,937 | B2 | 4/2018 | Kobayashi et al. |
| 2006/0059875 | A1 | 3/2006 | Malgorn et al. |
| 2009/0100811 | A1* | 4/2009 | Scheckel ............ B01D 46/0041 55/448 |
| 2009/0250044 | A1* | 10/2009 | Braun ................... B01D 45/12 123/573 |
| 2010/0229510 | A1 | 9/2010 | Heinen et al. |
| 2011/0179755 | A1* | 7/2011 | Gruhler ................... B29C 65/58 55/320 |
| 2014/0157737 | A1* | 6/2014 | Schleiden ............. F01M 13/04 55/464 |
| 2015/0052862 | A1* | 2/2015 | Wakabayashi ....... B01D 50/002 55/462 |
| 2015/0114368 | A1* | 4/2015 | Kurita ..................... F16N 13/04 123/573 |
| 2015/0135662 | A1 | 5/2015 | Chapman |
| 2017/0145879 | A1* | 5/2017 | Ratajczack ............ B01D 45/08 |
| 2018/0119587 | A1* | 5/2018 | Morishita .............. F01M 13/04 |

FOREIGN PATENT DOCUMENTS

| | | |
|---|---|---|
| JP | 2010248935 A | 11/2010 |
| JP | 2015098024 A | 5/2015 |
| JP | 2016114035 A | 6/2016 |
| KR | 101361571 B1 | 2/2014 |

OTHER PUBLICATIONS

International Search Report for International Application No. PCT/JP2017/029123, dated Oct. 31, 2017, 2 pages.
Written Opinion of the International Searching Authority for International Application No. PCT/JP2017/029123, dated Oct. 31, 2017, 5 pages.

* cited by examiner

OIL SEPARATING DEVICE

CROSS-REFERENCE TO RELATED APPLICATIONS

This application is a U.S. National Phase Application of PCT/JP2017/029123, filed Aug. 10, 2017, which claims the benefit of priority to GB Application No. 1614108.7, filed Aug. 17, 2016 the contents of which are hereby expressly incorporated by reference in their entirety.

TECHNICAL FIELD

The present invention relates to an oil separating device for separating an oil mist from a blow-by gas.

BACKGROUND ART

When an internal combustion engine mounted on a vehicle is operated, an unburned gas is generated in a combustion chamber. The unburned gas is called a blow-by gas, and the blow-by gas is leaked from a combustion chamber to a crankcase through a gap between a piston and a cylinder wall. The blow-by gas staying in the crankcases causes oil degradation in the crankcase. Therefore, generally, a blow-by gas circulation device is provided to discharge the blow-by gas from the crankcase and to circulate the blow-by gas to the combustion chamber through an intake path.

However, when the blow-by gas flows into the crankcase, oil stored in the crankcase becomes an oil mist, and the oil mist is mixed in the blow-by gas. That is, the blow-by gas leaked into the crankcase contains the oil mist. Then, if the blow-by gas containing the oil mist flows into the intake path to the combustion chamber, it causes excess oil supply to the intake path; and due to the excess oil supply, exhaust emissions are discharged into the intake path; thereby, an inlet valve is blocked and engine oil consumption is increased. Also, if the blow-by gas containing the oil mist is combusted in the combustion chamber, a white smoke is generated.

Therefore, an oil separating device for separating the oil mist from the blow-by gas is provided to prevent the oil mist from flowing into the combustion chamber through the intake path when the blow-by gas is circulated from the crankcase to the combustion chamber.

As a prior art of the oil separating device, there is, for example, an oil separator shown in Patent Document 1. The oil separator includes a filter and separation plates. When the blow-by gas flows in the filter, most of the oil mist contained in the blow-by gas is caught in the filter, and the oil mist not caught in the filter is discharged toward the separation plates and collides with the separation plates; thereby the oil mist not caught in the filter is adhered on a surface thereof, and as a result, the oil mist not caught in the filter is further removed.

However, the oil mist not caught in the filter has small oil particles, and the separation plates are arranged to form a meandering flow passage to flow the blow-by gas toward a gas flow outlet. In the structure of the oil separating device, it is hard to separate the oil mist having the small oil particles from the blow-by gas. Therefore, oil separation efficiency is inefficient.

As another prior art of the oil separating device, there is an apparatus for coalescing particles and separating oil shown in Patent Document 2. The oil separating device includes an assembly for coalescing particles of a fluid, and a plurality of ribs arranged apart from the assembly. When the fluid flows in the assembly, oil mist coalesces together, and oil droplets are deposited on an inner wall of the assembly; and the oil droplets are discharged from an outlet thereof with the fluid. The oil droplets discharged from the assembly collide with the ribs and trapped in grooves formed between the ribs to form a coating of oil across the ribs. As a result, the fluid is separated into the oil droplets and air in which the oil droplets have been removed.

However, in the structure of the oil separating device, the oil drops containing large particulates and small particulates are not efficiently separated from the fluid because the oil droplets are separated only by colliding with the ribs.

In order to solve the above problems, an oil separating device for effectively separating an oil mist containing large particulates and small particulates from a blow-by gas, is provided in the present invention.

CITATION LIST

Patent Literature

Patent Document 1: Japanese Patent Application Publication No. 2010-248935.

Patent Document 2: Japanese Patent Application Publication No. 2015-98024.

SUMMARY OF INVENTION

In a first aspect of the present invention, an oil separating device for separating an oil mist from a blow-by gas, is arranged on a flow passage of the blow-by gas, and the oil separating device comprises an oil separator including an inlet formed at one end thereof and an outlet formed at another end thereof opposite to the one end; a collision wall arranged at a downstream side of the oil separator, and including an uneven portion formed on a surface thereof to face the outlet of the oil separator; and a filter arranged between the oil separator and collision wall. The oil separator is formed such that the oil mist in the blow-by gas coalesces together to form a coalesced oil mist, the filter removes the coalesced oil mist from the blow-by gas, and the collision wall separates an oil mist remained in the blow-by gas passing through the filter.

In the structure of the oil separating device, oil drops containing large particulates and small particulates, are efficiently separated from the blow-by gas because the filter is arranged between the oil separator and the collision wall.

In a second aspect of the present invention, the collision wall further comprises a side wall having a width larger than that of the filter and a height higher than that of the uneven portion in a direction toward the filter. In the structure, a space is formed by the filter, the uneven portion and the side wall, so that the blow-by gas is guided in the space. Therefore, the oil mist is effectively collected.

In a third aspect of the present invention, the uneven wall includes concave and convex portions arranged alternately to increase a surface area collided with the blow-by gas, and each of the concave and convex portions vertically continuously extends in a direction perpendicular to a flow direction of the blow-by gas. In the structure, the oil drops adhered on the uneven wall is effectively guided to an oil outlet.

In a fourth aspect of the present invention, the oil separator includes a curved wall along which the blow-by gas spirals to coalesce together. In the structure, the oil mist coalesces together, and a coalesced oil mist is formed in the separator to be separated in the filter and the collision wall. Therefore, collection performances of the filter and collision wall are improved.

In a fifth aspect of the present invention, the filter is arranged apart from the uneven wall to form a space therebetween, and the filter has a width larger than the outlet of the separator such that the blow-by gas in the space is discharged out from the space through the filter after colliding the blow-by gas with the collision wall. In the structure, the filter has a size enough to discharge the blow-by gas in the space. Therefore, the blow-by gas in which the oil mist has been separated by the filter and collision wall is effectively discharged from the space through the filter.

DESCRIPTION OF EMBODIMENTS

Figure 1:
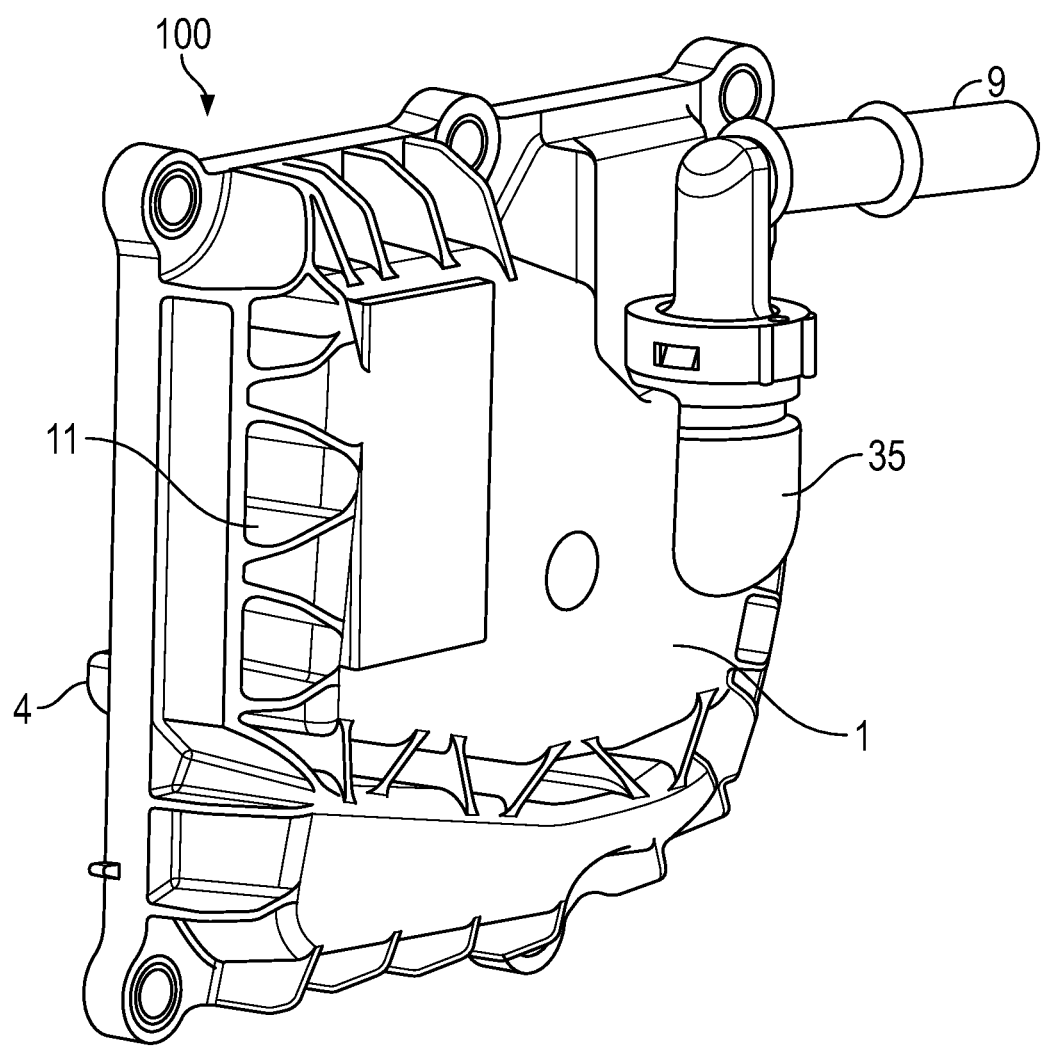
FIG. 1 is a perspective view of an oil separating device in accordance with an embodiment seen from a front side thereof.
Figure 2:
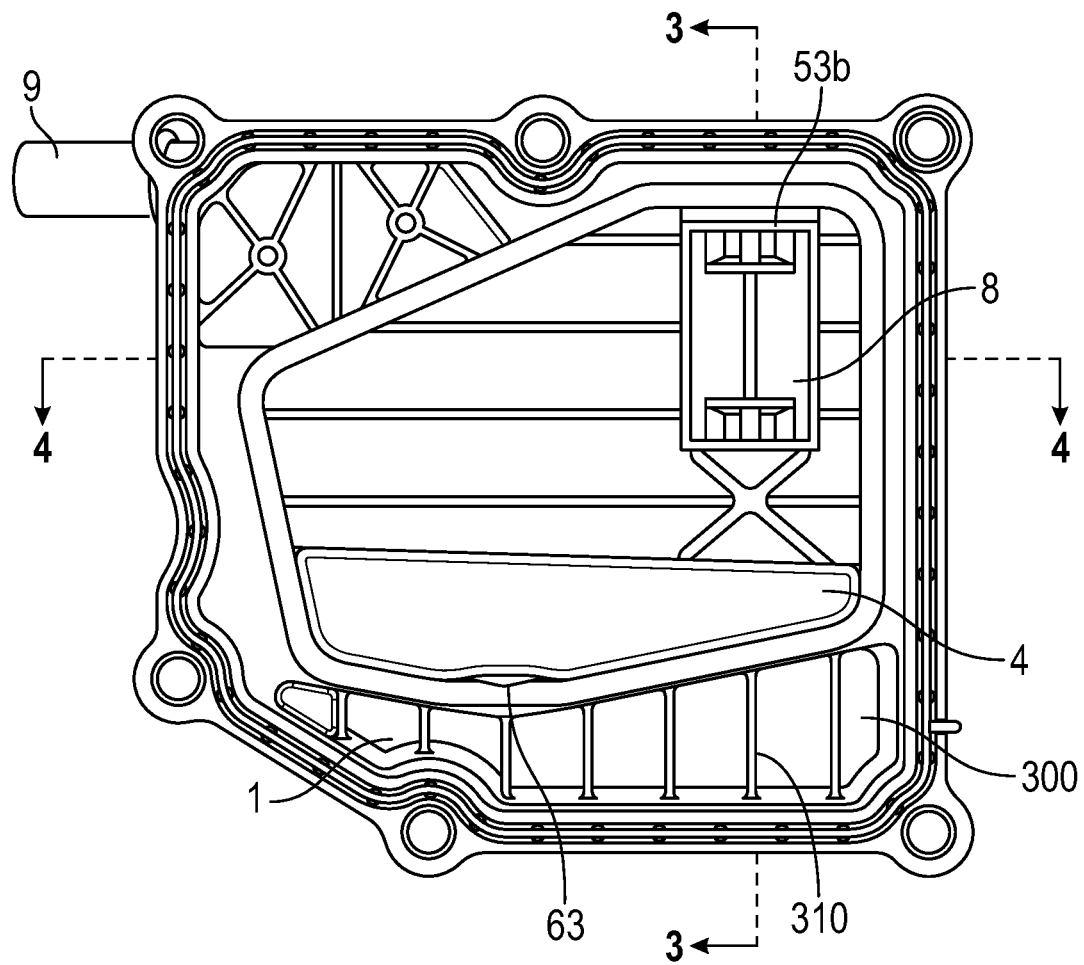
FIG. 2 is a rear view of the oil separating device in accordance with the embodiment.

Hereinafter, an embodiment of the present invention will be explained with reference to FIGS. 1 to 10.

First of all, an overall structure of an embodiment of the present invention will be explained with reference to FIGS. 1 to 4. However, the overall structure is not limited to the embodiment described in the description.

Generally, an oil separating device 100 is provided on a flow passage of a blow-by gas circulated from a crankcase to a combustion chamber.

In FIGS. 1 to 4, the oil separating device 100 includes a housing 1, a cover 4 covering the housing 1, a separator 8 fixed in the cover 4, a filter 7 arranged apart from the separator 8 in the housing 1, and an exit tube 9 extending outwardly from the housing 1.

Detailed structure of each element will be explained hereinafter.

Figure 3:
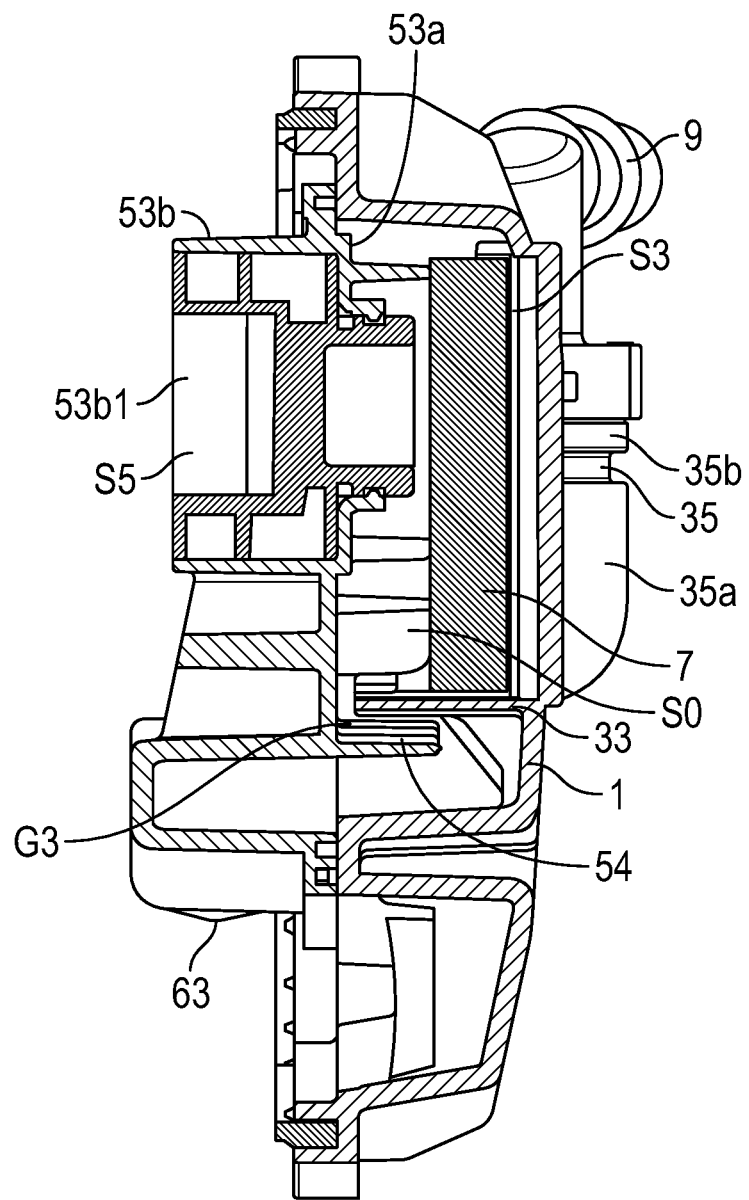
FIG. 3 is a vertical cross sectional view of the oil separating device in accordance with the embodiment taken along line 3-3 in FIG. 2, showing an inner structure of the oil separating device.
Figure 4:
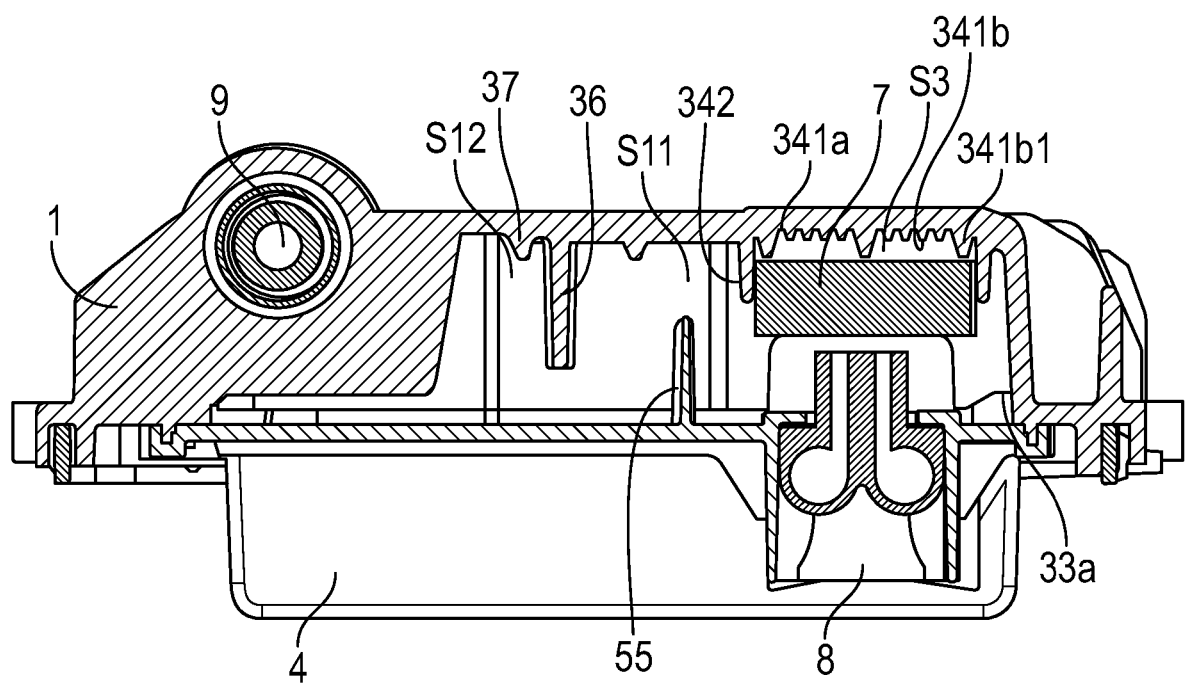
FIG. 4 is a horizontal cross sectional view of the oil separating device in accordance with the embodiment taken along line 4-4 in FIG. 2, showing the inner structure of the oil separating device.
Figure 5:
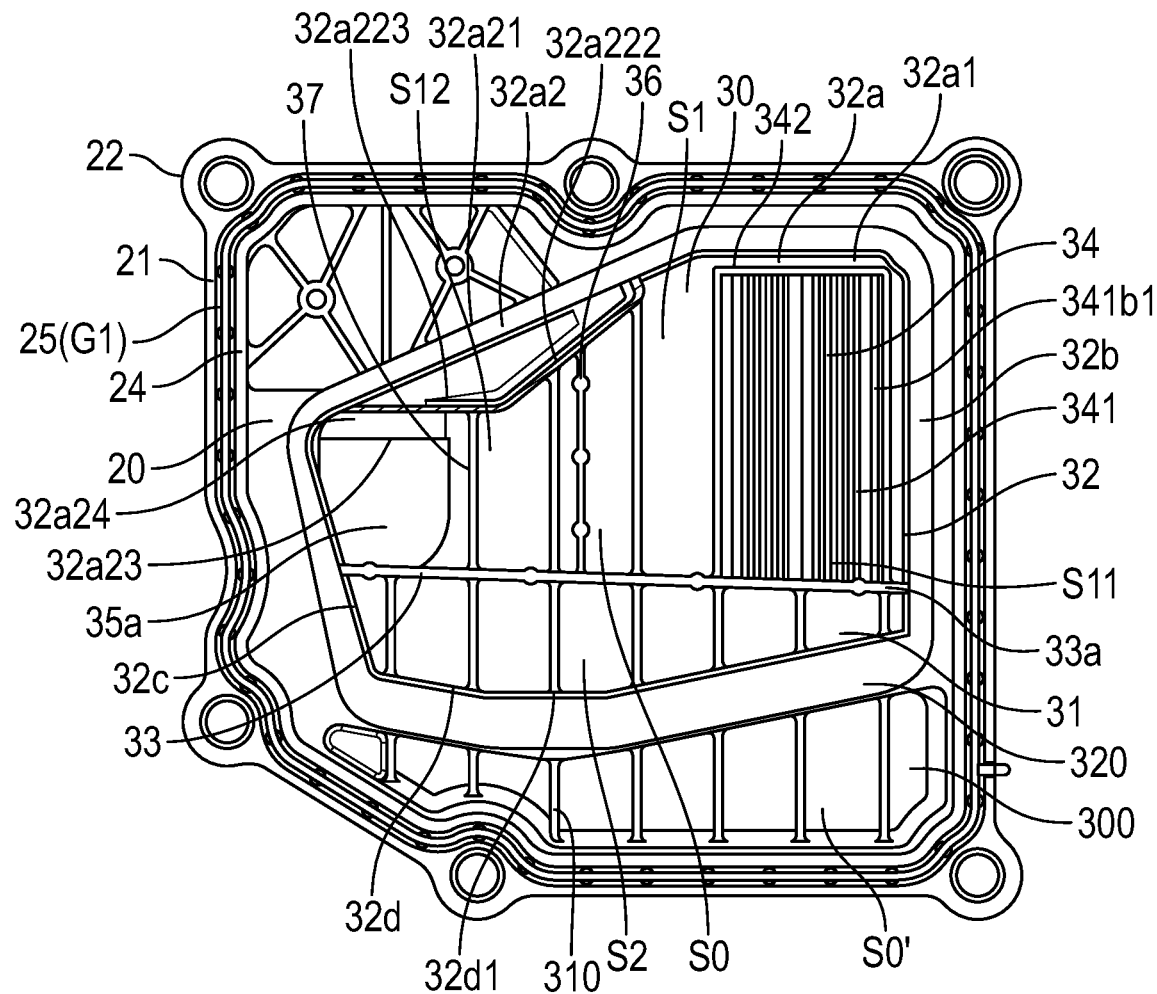
FIG. 5 is a rear view of a housing of the oil separating device in accordance with the embodiment.
Figure 6:
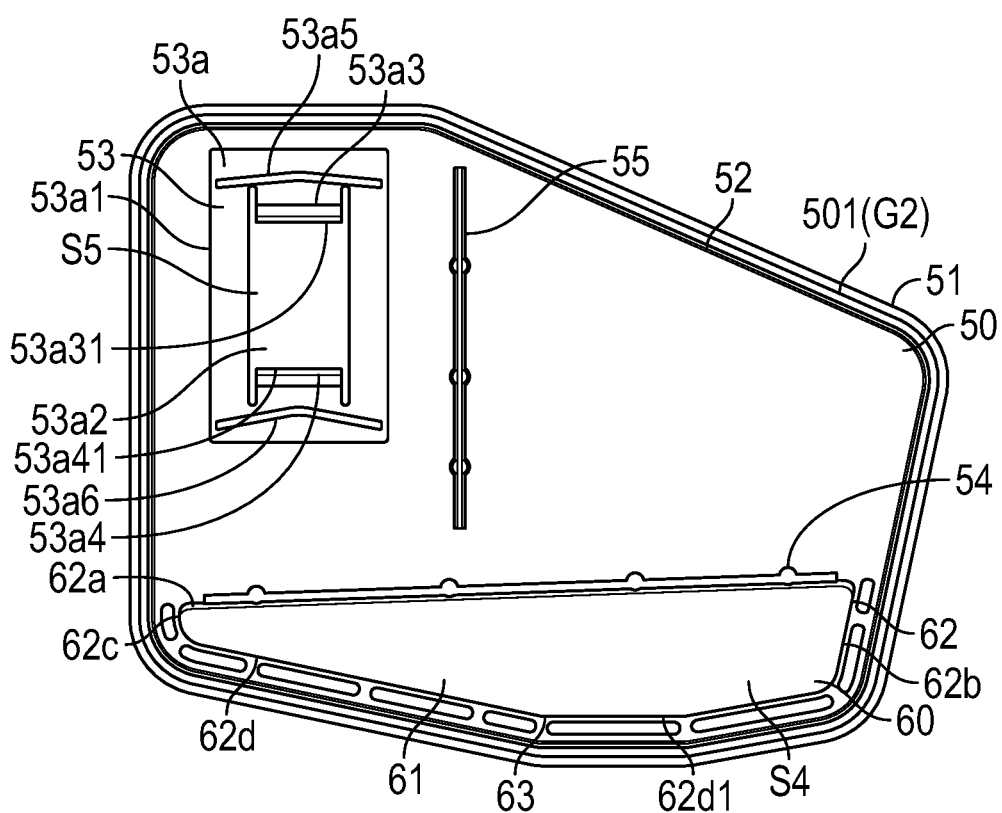
FIG. 6 is a front view of a cover of the oil separating device in accordance with the embodiment.

The housing 1 will be explained with reference to FIGS. 3 to 5. The housing 1 includes a plate portion 20, a large swollen portion 30 expanding outwardly from a front surface of the plate portion 20 to form a space S0 thereinside, and a small swollen plate portion 300 formed below the swollen portion 30 and expanding outwardly from the front surface of the plate portion 20 to form a space S0' thereinside.

The plate portion 20 has a substantially rectangular shape, and includes an outer peripheral part 21 extending along an outer periphery of the plate portion 20 and projecting inwardly from a rear surface of the plate portion 20. The outer peripheral part 21 has flange portions 22 and fixing holes 23 formed in the flange portions 22. In the embodiment, the outer peripheral part 21 has six flange portions 22, each being formed at each corner of the plate portion 20 and substantially intermediate portion on each of upper and lower sides of the plate portion 20; and six fixing holes 23, each being formed in the flange portion 22. However, the fixing holes 23 may be formed as required to fix the oil separating device 100. The plate portion 20 further includes an inner peripheral part 24 arranged inwardly apart from the outer peripheral part 21 to from a gap G1 therebetween. In the gap G1, a seal member 25 is fit.

The large swollen portion 30 expands outwardly from a center portion of the front surface of the plate portion 20 to form the space S0 thereinside. The large swollen portion 30 includes a bottom wall 31, and a peripheral wall 32 integrally formed with the bottom wall 31 and surrounding the bottom wall 31 to form a recess thereinside, and in the recess, the space S0 is formed. The large swollen portion 30 has an engaging portion 320 to engage the cover 4 described later, and in the embodiment, the engaging portion 320 is a projection projecting inwardly and extending substantially along the peripheral wall 32. However, the engaging portion 320 is not limited to the projection. The peripheral wall 32 includes an upper peripheral wall 32a, a first side peripheral wall 32b, a second side peripheral wall 32c and a lower peripheral wall 32d. The upper peripheral wall 32a has a flat part 32a1 forming an uppermost part of the peripheral wall 32, in a vertical direction, and an inclined part 32a2 inclined downwardly from the flat part 32a1. The inclined part 32a2 has an inclined plate 32a21, a detour inclined plate 32a222 branched from a middle of the inclined plate 32a21 and inclined downwardly apart from the inclined plate 32a21, and a flat plate 32a223 extending from one end of the detour inclined plate 32a222 to one end of the inclined plate 32a21. On the flat plate 32a223, an opening 32a23 is formed with an edge part 32a24 shaped into a cylinder. A height of the upper peripheral wall 32a becomes lower in a direction from the first side peripheral wall 32b toward the second side peripheral wall 32c. The lower peripheral 32d is curved downwardly from the first side peripheral wall 32b and the second side peripheral wall 32c toward a flat part 32d1 forming a lowermost part of the peripheral wall 32. The first side peripheral wall 32b is arranged to face the second side peripheral wall 32c, and the first and second side peripheral walls 32b, 32c extend vertically to connect each end of the upper peripheral wall 32a and the lower peripheral wall 32d.

The large swollen portion 30 further includes a first horizontal partition 33 extending horizontally in the space S0 and connecting the first side peripheral wall 32b and the second side peripheral wall 32c to partition the space S0 into spaces S1 and S2; a collision wall 34 formed on an inner surface of the bottom wall 31 and extending vertically from the first horizontal partition 33 toward the flat part 32a1 of the upper peripheral wall 32a; a cylindrical member 35 having a semi-cylindrical projection part 35a projecting outwardly from the bottom wall 31 to form the opening 32a21 thereinside on the flat plate 32a223 and a cylindrical connecting part 35b projecting integrally upwardly from the semi-cylindrical projection part 35a around the opening 32a21; a first separating wall 36 projecting inwardly from the inner surface of the bottom wall 31 and extending vertically from the first horizontal partition 33 toward the inclined plate 32a222 of the upper peripheral wall 32a to connect the first horizontal partition 33 and the inclined part 32a2, the first separating wall 36 partitioning the space S1 into spaces S11 and S12; and vertical ribs 37 formed on the inner surface of the bottom wall 31 and extending from the lower peripheral wall 32d toward the upper peripheral wall 32a through the first horizontal partition 33.

The first horizontal partition 33 partitions the space S0 into spaces S1 and S2, and the space S1 is arranged above the space S2. In the space S1, the oil mist is separated and adhered on the collision wall 34 to form oil droplets, and the blow-by gas in which the oil mist has been removed, flows toward a gas inlet 91a of the exit tube 9. In the space S2, the oil droplets adhered on the collision wall 34 flow downwardly from the space S1 (S11) to the space S2, and thereafter, in the space S2, the oil droplets flow from the lower peripheral wall 32d to the flat part 32d1. Therefore, the first horizontal partition 33 has a portion such as a hole or a notch through which the oil droplets flow from the space 1 to the space 2. In the embodiment, the portion is a notch part 33a, and the notch part 33a is formed at one corner thereof near the collision wall 34. However, the portion to flow the oil droplets is not limited to the notch part 33a, and a position of the notch is not limited to the corner near the collision wall 34. Further, the first horizontal partition 33 is inclined such that the oil droplets flow toward the notch part 33a. In the embodiment, the first horizontal partition 33 is inclined downwardly from the second side peripheral wall 32c toward the first side peripheral wall 32b in a horizontal direction, and the first horizontal partition 33 is also inclined downwardly from a front side of the first horizontal partition 33 toward a rear side of the first horizontal partition 33 where the notch part 33a is formed.

The first separating wall 36 partitions the space S1 into spaces S11 and S12; and the space S11 is formed at a side where the first side peripheral wall 32b is arranged, and the space S12 is formed at a side where the second side peripheral wall 32c is arranged. The spaces S11 and S12 are communicated each other because the first separating wall 36 projects inwardly only halfway on the first horizontal partition 33. The space S11 has a size larger than that of the space S12 because the flat part 32a1 of the peripheral wall 32 is positioned higher than the inclined part 32a2 of the peripheral wall 32, and the first horizontal partition 33 is inclined downwardly from the second side peripheral wall 32c toward the first side peripheral wall 32b; therefore, in the space S11, enough space is obtained to form the collision wall 34. Also, after the oil mist has been removed, the blow-by gas smoothly flows toward the exit tube 9 because the blow-by gas flows in a direction from a large space (S11) to a small space (S12).

In the space S2, the lower peripheral wall 32d is curved downwardly toward the flat part 32d1 from each side of the first side peripheral wall 32b and the second side peripheral wall 32c and also inclined downwardly from a front side of the lower peripheral wall 32d toward a rear side of the lower peripheral wall 32d. The lower peripheral wall 32d is formed at a position, in a vertical direction, higher than the oil outlet 63 of the cover 4 described later. Therefore, the oil droplets flowing from the space S1 to the space S2 are guided to the oil outlet 63 of the cover 4 through the lower peripheral wall 32d.

The cylindrical member 35 includes a semi-cylindrical projection part 35a and a cylindrical connecting part 35b. The semi-cylindrical projection part 35a projects outwardly from the bottom wall 31 to form the opening 32a21 thereinside; and the cylindrical connecting part 35b is formed into a cylindrical shape, and has an opening formed at one end thereof to insert the exit tube 9 therein, the opening being covered by a holder 93 of the exit tube 9. However, a shape of the cylindrical member 35 is not limited to the cylindrical shape. The cylindrical member 35 is integrally formed with the bottom wall 31 and the upper peripheral wall 32a.

The collision wall 34 is formed on the inner surface of the bottom wall 31. The collision wall 34 includes an uneven wall 341 formed on the inner surface of the bottom portion 31 and a side wall 342 enclosing the uneven wall 341.

The uneven wall 341 includes concave portions 341a and convex portions 341b, arranged alternately, to increase a colliding area of the uneven wall 341 with which the blow-by gas containing the oil mist collides, and each of the concave portions 341a and convex portions 341b vertically continuously extends from the front side of the first horizontal partition 33 toward the flat part 32a1 of the peripheral wall 32.

The convex portions 341b include large convexes 341b1, each having a height higher than other convexes in the projecting direction from the inner surface of the bottom portion 31, as support ribs supporting the filter 7. In the embodiment, the large convexes 341b1 are formed at a center portion and side portions of the uneven wall 341. However, the portions of the large convexes 341b1 are not limited to the center portion and side portions of the uneven wall 341.

The uneven wall 341 has a size large enough to be collided with the blow-by gas, and the uneven wall is arranged to adjust a collision angle of the blow-by gas. That is, the uneven wall 341 has the colliding area having a width larger than that of an outlet portion 84 of the separator 8 described later, and a length longer than that of the outlet portion 84 of the separator 8 described later; and the collision angle is adjustable by inclining the uneven wall 341.

Therefore, the oil mist contained in the blow-by gas is efficiently adhered on the uneven wall 341 when the blow-by gas collides with the collision wall 34. The oil mist adhered on the uneven wall 341 is gathered to form the oil droplets, and the oil droplets flow downwardly, by the gravity, along the concave portions 341a formed between the convex portions 341b. The oil drops reach the first horizontal partition 33, and thereafter, the oil drops flow on the first horizontal partition 33 inclining toward the notch part 33a, and flow into the space 2 through the notch part 33a.

In the embodiment, the uneven wall is arranged substantially perpendicular to the flow direction of the blow-by gas; however, the uneven wall may be inclined based on the preferable collision angle.

The side wall 342 extends from the first horizontal partition 33 to enclose the uneven wall 341 along an outer periphery of the uneven wall 341. The side wall 342 projects more inwardly than the convex portions 341b (large convexes 341b1) from the inner surface of the bottom portion 31, and a space S3 is formed between the uneven wall 341 and the filter 7, described later, inside the side wall 342. That is, the filter 7 is fit inside the side wall 342, and the space S3 is enclosed by the filter 7, the uneven wall 341 and the side wall 342. In the space S3, the blow-by gas flowing through the filter 7 collides with the uneven wall 341, and the blow-by gas in which the oil mist has removed is filled. The blow-by gas in the space S3 flows out through the filter 7 from the space S3, and flows toward the gas inlet 91a of the exit tube 9.

The small swollen portion 300 is formed below the large swollen portion 30; and includes a bottom wall 301, and a peripheral wall 302 surrounding the bottom wall 301 to form a space S0' thereinside. In the space S0', vertical ribs 310 extend in vertical direction.

At a front side of the housing 1, there are a plurality of ribs 11 formed around the large swollen portion 30 and the small swollen portion 300 on the front surface of the plate portion 20. The cover 4 will be explained with reference to FIGS. 2, 3 and 6. The cover 4 includes a plate portion 50 and a swollen portion 60 expanding outwardly from a rear surface of a lower portion of the plate portion 50 to form a space S4 thereinside.

The swollen portion 60 includes a bottom wall 61 and a peripheral wall 62 integrally formed with the bottom wall 61 and surrounding the bottom wall 61 to from a recess thereinside, and in the recess, the space 4 is formed. The peripheral wall 62 includes an upper peripheral wall 62a, a first side peripheral wall 62b, a second side peripheral wall 62c and a lower peripheral wall 62d. The swollen portion 60 further includes an oil outlet 63 formed on the lower peripheral wall 62d. The first side peripheral wall 62b is arranged to face the second side peripheral wall 62c, and the first and second side peripheral walls 62b, 62c extend vertically to connect each end of the upper peripheral wall 62a and the lower peripheral wall 62d.

The lower peripheral wall 62d includes a flat part 62d1, and is curved downwardly toward the flat part 62d1 from lower ends of the first and second side peripheral walls 62b, 62c, and the oil outlet 63 is formed on the flat part 62d1. Therefore, the oil droplets flowing into the space S4 flow toward the oil outlet 63 along the lower peripheral wall 62d, and the oil droplets are effectively discharged from the oil separating device through the oil outlet 63. In the embodiment, the flat part 62d1 and the oil outlet 63 are formed on a center portion of the lower peripheral wall 62d. However, the positions of the flat part 62d1 and the oil outlet 63 are not limited to the center portion, and may be formed on a side portion thereof.

The plate portion 50 has an external shape substantially same as that of the peripheral wall 32 of the swollen portion 30 to cover the space S0 in the swollen portion 30 of the housing 1. The plate portion 50 includes an outer peripheral part 51 extending along an outer periphery thereof and projecting inwardly from a rear surface thereof, and an inner peripheral part 52 arranged inwardly apart from the outer peripheral part 51 to form a gap G2 therebetween. An engaged portion 501 is formed in the gap G2 to engage the engaging portion 320 of the housing 1. In the embodiment, the engaged portion 501 is a recess formed in the gap G2. The engaging portion 320 (projection) of the peripheral wall 32 is fit into the engaged portion 501 (gap G2) to engage the housing 1 and the cover 4.

The plate portion 50 further includes a separator fixing portion 53 fixing the separator 8, described later, therein; a second horizontal partition 54 projecting inwardly from an upper peripheral wall 62a of the swollen portion 60 and extending horizontally to have a length substantially same as that of the upper peripheral wall 62a; and a second separating wall 55 projecting inwardly from a front surface of the plate portion 50 and extending vertically above a center portion of the second horizontal partition 54.

The separator fixing portion 53 is arranged at a position facing the collision wall 34 when the cover 4 is engaged to the housing 1. The separator fixing portion 53 includes a fixing member for fixing the separator 8 to the cover 4. In the embodiment, the separator fixing portion 53 is formed by an inside rectangular portion 53a and an outside rectangular portion 53b, the inside rectangular portion 53a inwardly swelling in a front direction and the outside rectangular portion 53b outwardly swelling in a rear direction to form a space S5 thereinside in which the separator 8 is stored. The inside rectangular portion 53a includes a front surface portion 53a1 having a front opening 53a2 communicated with the space S5 at a front side thereof, and the outside rectangular portion 53b includes a rear opening 53b1 communicated with the space S5 at a rear side thereof. The rear opening 53b1 is larger than the front opening 53a2 because the front opening 53a2 is formed on the front surface portion 53a2, and the rear opening 53b1 is fully opened at the rear side. Therefore, the separator 8 is inserted from the rear side to the front side to be stored in the space S5. The front surface portion 53a1 includes a pair of elastic pieces 53a3, 53a4 projecting inwardly from upper and lower edges of the front opening 53a2 into the front opening 53a2 to form notches at two sides of each of the pair of elastic pieces 53a3, 53a4. The pair of elastic pieces 53a3, 53a4 projects inwardly, and then curved outwardly in a direction away from the front opening 53a2 to face each other, to from L-shape. The pair of elastic pieces 53a3, 53a4 respectively has hook portions 53a31, 53a41 to fit into grooves 841, 842 of the separator 8; thereby, the separator 8 is fixed to the separator fixing portion 53. In the embodiment, the separator 8 is fixed to the cover 4 by engaging the hook portion 53a31, 53a41 and the grooves 841, 842 of the separator 8. However, the fixture is not limited to hooks and grooves, and any fixture may be used to fix the separator 8.

The front surface portion 53a1 further includes a pair of projecting ribs 53a5, 53a6 projecting inwardly toward the filter 7. The pair of projecting ribs 53a5, 53a6 projects more inwardly than the pair of elastic pieces 53a3, 53a4 in the projecting direction to support the filter 7 at a positon apart from the openings 84a, 84b of the separator 8. Each of the pair of projecting ribs 53a5, 53a6 is curved downwardly from a center portion toward side portions thereof in a horizontal direction thereof.

An engagement structure of the housing 1 and the cover 4 will be explained with reference to FIG. 3.

The plate portion 50 of the cover 4 has the external shape substantially same as that of the large swollen portion 30 of the housing 1; and the housing 1 has the engaging portion 320, and the cover 4 has the engaged portion 501. The engaging portion 320 of the housing 1 engages the engaged portion 501 of the cover 4; thereby the housing 1 and the cover 4 are engaged such that the cover 4 covers the space S0 in the housing 1. In the embodiment, the engaging portion 320 is a projection, and the engaged portion 501 is a recess (gap G2), and the projection is fit into the recess.

When the cover 4 is engaged to the housing 1, the second separating wall 55 is arranged, in the space S11, between the first separating wall 36 and the collision wall 34; therefore, a flow passage of the blow-by gas flowing out from the space S3 is formed by the first separating wall 36 and the second separating wall 55 such that the blow-by gas is meandered toward the cylindrical member 35. While the blow-by gas is meandered in the flow passage, the blow-by gas collides with the first separating wall 36 and the second separating wall 55; thereby, the oil mist is adhered on the first separating wall 36 and the second separating wall 55. That is, the oil mist is further separated from the blow-by gas after being removed by the collision wall 34. Therefore, the oil mist is effectively separated. The oil mist adhered on the first separating wall 36 and the second separating wall 55 is respectively gathered thereon to form the oil droplets. The oil droplets flow downwardly by the gravity load to the first horizontal partition 33.

When the cover 4 is engaged to the housing 1, the second horizontal partition 54 is arranged under the first horizontal partition 33 to form a gap G3 therebetween. Therefore, the oil droplets flowing to the first horizontal partition 33 flow further downwardly along the second horizontal partition 54 inclined from the rear side toward the front side thereof and flow into the space S2 through the gap G3.

Further, when the cover 4 is engaged to the housing 1, the lower peripheral wall 32d of the peripheral wall 32 is arranged at a position higher than the oil outlet 63 in a vertical direction. Therefore, the oil droplets flowing into the space S2 through the notch part 33a and the second horizontal partition 54, flow toward the space S4 along the lower peripheral wall 32d inclined from the front side toward the rear side thereof, and flow to the oil outlet 63 along the lower peripheral wall 62d inclined toward the flat part 62d1 where the oil outlet 63 is formed. That is, the oil droplets formed by the first separating wall 36 and the second separating wall 55 are effectively guided to the oil outlet 63.

Figure 7:
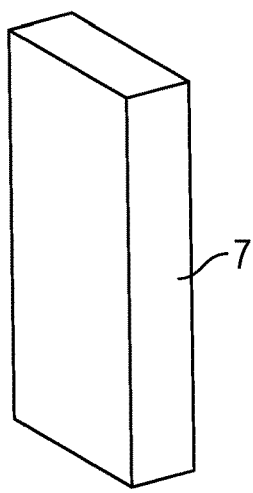
FIG. 7 is a perspective view of a filter of the oil separating device in accordance with the embodiment.
Figure 8:
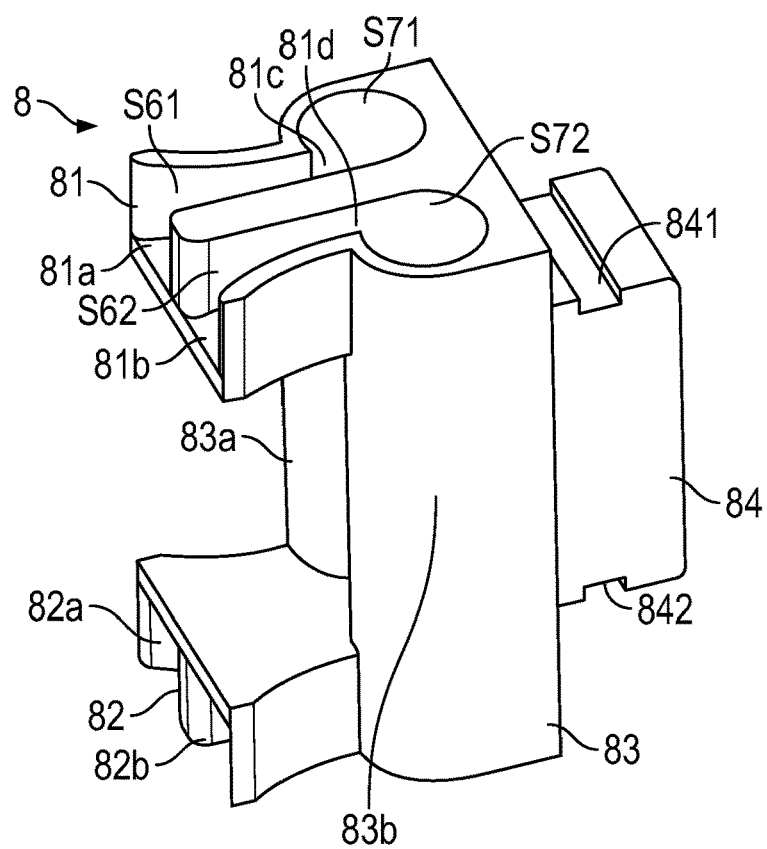
FIG. 8 is a perspective view of a separator of the oil separating device in accordance with the embodiment seen from a front side thereof.
Figure 9:
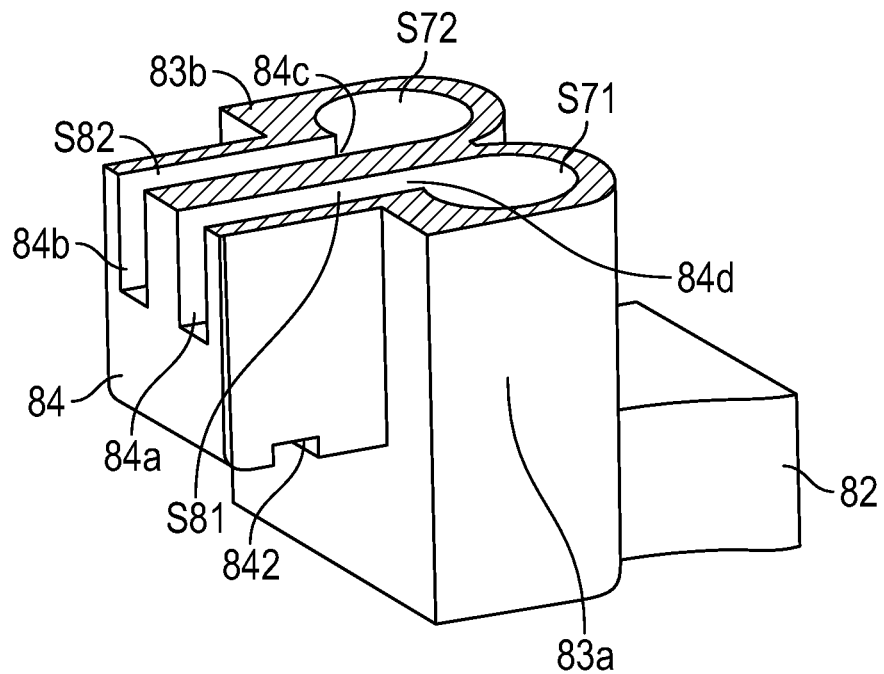
FIG. 9 is a horizontal cross-sectional perspective view of the separator in accordance with the embodiment seen from a rear side thereof, showing an inner structure of the separator.

The filter 7 will be explained with reference to FIGS. 3, 4 and 7. The filter 7 has a rectangular parallelepiped shape to fit a shape of the collision wall 34; however, the shape of the filter 7 is not limited to the rectangular parallelepiped shape.

The filter 7 is arranged between the collision wall 34 and the separator 8 described later. More particularly, the filter 7 is arranged apart from the separator 8 in a blow-by gas flow direction, and the filter 7 is fit inside the side wall 342 to face the uneven wall 341 of the collision wall 34; thereby, the space S3 is formed by the filter 7, the uneven wall 341 and the side wall 342. The filter 7 is sandwiched between the large convexes 341b1 of the collision wall 34 and the pair of projecting ribs 53a5, 53a6 to fix inside the side wall 342. In the embodiment, a nonwoven fabric filter, a mesh filter or the like is used as the filter 7; and the projections 343 are pierced into the filter 7, and the filter 7 is fastened by push nuts. However, any fixture may be used to fix the filter 7 to the collision wall 34.

The separator 8 will be explained with reference to FIGS. 2 to 4, 8 and 9. The separator 8 includes inlet portions 81, 82 arranged at a top portion and a lower portion thereof a spiral flow portion 83 integrally formed with the inlet portions 81, 82 and connected to the inlet portion 81, 82 at one side thereof and an outlet portion 84 integrally formed with the spiral flow portion 83 and connected to the spiral flow portion 83 at the other side opposite to the one side thereof.

The inlet portion 81 includes openings 81a, 81b formed at one end thereof, inner ends 81c, 81d formed at the other end opposite to the one end thereof, and spaces S61, S62 are formed therebetween. The inlet portion 81 is formed such that the space S61 has a substantially trumpet-shape to decrease a cross-sectional area of the space S61 in a direction from the opening 81a to the inner end 81c, and the space S62 has a substantially trumpet-shape to decrease a cross-sectional area of the space S62 in a direction from the opening 81b to the inner end 81d. Therefore, the blow-by gas from the crank case is smoothly guided from the openings 81a, 81b to the inner ends 81c, 81d. The inlet portion 82 has a structure same as the inlet portion 81. Therefore, detailed explanation of a structure of the inlet portion 82 is omitted.

The spiral flow portion 83 extends vertically to connect the inlet portions 81, 82. The spiral flow portion 83 includes curved walls 83a, 83b curved to form cylindrical spaces S71, S72 thereinside. The spaces S71, S72 are communicated with the spaces formed inside the inlet portions 81, 82. In the spaces S71, S72, the blow-by gas flows spirally; thereby, the blow-by gas collides with inner surfaces of the curved walls 83a, 83b, and the oil mist contained in the blow-by gas coalesces together to form a particle having a size large enough to be separated by the filter 7 and the collision wall 34.

The outlet portion 84 projects horizontally outwardly from a center portion of the spiral flow portion 83 between the inlet portions 81, 82 in a direction opposite to the inlet portions 81, 82. The outlet portion 84 includes openings 84a, 84b formed at one end thereof, inner ends 84c, 84d formed at the other end opposite to the one end thereof, and spaces S81, S82 formed between the openings 84a, 84b and the inner ends 84c, 84d. The spaces S81, S82 are communicated with the spaces S71, S72 at the inner ends 84c, 84d. In the spaces S81, S82, the blow-by gas containing the coalesced oil mist is guided to discharge from the openings 84a, 84b. The outlet portion 84 further includes grooves 841, 842 formed on a top surface and a lower surface thereof, and the hook portions 53a31, 53a41 of the separator fixing portion 53 are fit in the grooves 841, 842. The grooves 841, 842 are formed at center portions of the top surface and the lower portion of the outlet portion 84 in a projecting direction of the outlet portion 84. The separator 8 is inserted in the separator fixing portion 53 from the rear side to the front side thereof, and the separator 8 is fixed to the cover 4 by engaging the hook portions 53a31, 53a41 of the separator fixing portion 53 and the grooves 841, 842.

Figure 10:
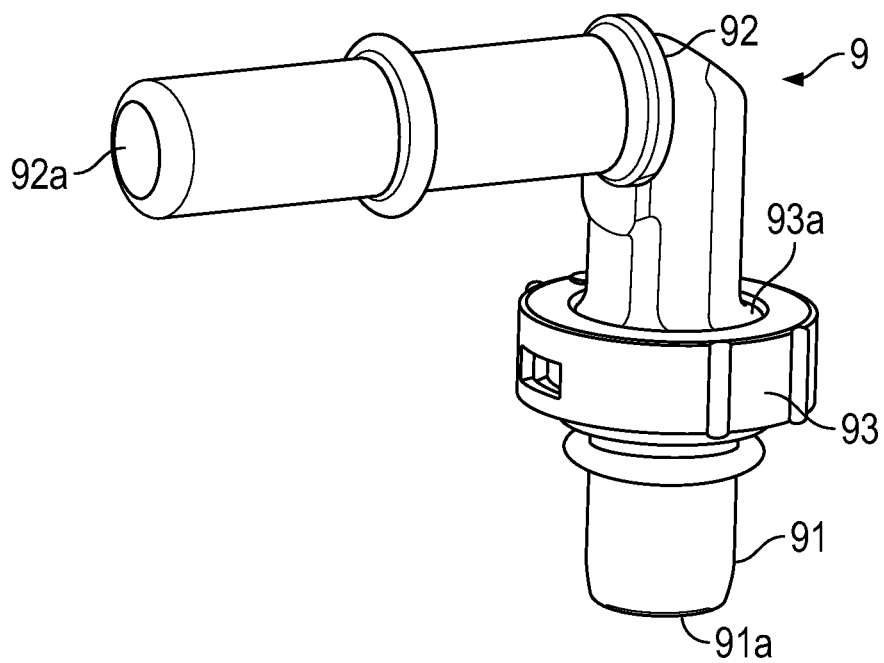
FIG. 10 is a perspective view of an exit tube of the oil separating device in accordance with the embodiment.

The exit tube 9 will be explained with reference to FIGS. 1 and 10. The exit tube 9 is connected to the cylindrical member 35 of the housing 1. The exit tube 9 includes an intake portion 91 having a cylindrical shape to be inserted in the cylindrical member 35 and having a gas inlet 91a into which the blow-by gas meandered through the first separating wall 36 and the second separating wall 55 flows; a connection part 92 connected to the intake portion 91 and having a gas outlet 92a from which the blow-by gas is discharged outwardly to circulate to the combustion chamber; and a holder 93 having an opening 93a in which the connection part 92 is inserted, and through which the exit tube 9 is fixed to the cylindrical member 35.

Finally, flow of the blow-by gas and separation of the oil mist will be explained. As described above, the blow-by gas is circulated from the crank case to the combustion chamber, and the oil separating device 100 is provided on the flow passage of a blow-by gas.

The blow-by gas from the crank case contains the oil mist, and the blow-by gas flows into the separator 8 through the openings 81a, 81b, 82a, 82b. The blow-by gas is guided by the inlet portions 81, 82 to the spiral flow portion 83. In the spiral flow portion 83, the blow-by gas spirally flows such that the oil mist contained in the blow-by gas coalesces together to form a particle having a size large enough to be separated by the filter 7 and the collision wall 34, and the blow-by gas containing the coalesced oil mist is guided to the outlet portion 84. The blow-by gas containing the coalesced oil mist is guided effectively because the outlet portion 84 is arranged at a middle portion between the inlet portions 81, 82 in a vertical direction.

The blow-by gas containing the coalesced oil mist is discharged outwardly from the openings 84a, 84b of the outlet portion 84, and flows into the filter 7 because the filter 7 is arranged at a downstream of the separator 8 in a flow direction of the blow-by gas. In the filter 7, the coalesced oil mist is primarily removed, and thereafter, the blow-by gas in which the oil mist has been removed by the filter 7 is guided in the space S3. The space 3 is a narrow space enclosed by the filter 7, the uneven wall 341, and the side wall 342. Therefore, in the space S3, the oil mist is effectively collected. The blow-by gas in the space S3 flows toward and collides with the uneven wall 341 because the uneven wall 341 is arranged at a downstream of the filter 7 in the flow direction of the blow-by gas; thereby, the oil mist in the blow-by gas is adhered on the uneven wall 341 to generate the oil droplets. That is, the oil mist is secondarily removed by the uneven wall 341. Therefore, the oil drops containing large particulates and small particulates are efficiently separated from the blow-by gas. Thereafter, the blow-by gas in the space S3 is separated into the oil droplets and the blow-by gas in which the oil mist has been removed by the filter 7 and the collision wall 7, called as "a gas without the oil mist" hereafter.

The oil droplets flow downwardly, by the gravity, along the concave portions 341a formed between the convex portions 341b, and reaches the first horizontal partition 33. The oil droplets are guided to the notch part 33a in accordance with inclination of the first horizontal partition 33, and flow into the space S2. In the space S2, the oil droplets are guided toward the oil outlet 63 of the cover 4 in accordance with arrangement and inclination of the lower peripheral wall 62d, and then the oil droplets are discharged from the oil separating device 100 through the oil outlet 63.

The gas from which the oil mist is removed flows out from the space S3 through filter 7, and flows toward the exit tube 9. In the flow passage to the exit tube 9, the gas without the oil mist is meandered by the first separating wall 36 and the second separating wall 55; thereby, the gas without the oil mist collides with the first separating wall 36 and the second separating wall 55. Therefore, the oil mist remained in the gas without the oil mist is adhered on the first separating wall 36 and the second separating wall 55, and the oil droplets are formed thereon. That is, the gas without the oil mist is separated into the oil droplets and the blow-by gas in which the remained oil mist has been removed from the gas without the oil mist, called as "a circulated gas" hereafter.

The circulated gas flows into the exit tube 9, and the circulated gas is discharged from the oil separating device 100 to supply to the combustion chamber through an intake path.

While the invention is explained with reference to the specific embodiment of the present invention, the explanation is illustrative and the invention is limited only by the appended claims.

The invention claimed is:

1. An oil separating device for separating an oil mist from a blow-by gas, arranged on a flow passage of the blow-by gas, comprising:
   an oil separator including an inlet formed at one end thereof and an outlet formed at another end thereof opposite to the one end;
   a collision wall arranged at a downstream side of the oil separator, and including an uneven wall formed on a surface thereof to face the outlet of the oil separator; and
   a filter arranged between the oil separator and collision wall,
   wherein the oil separator includes a curved wall along which the blow-by gas spirals to coalesce together such that the oil mist in the blow-by gas forms a coalesced oil mist, the filter removes the coalesced oil mist from the blow-by gas, and the collision wall separates a remained oil mist remained in the blow-by gas passing through the filter,
   the collision wall further comprises a side wall having a width larger than that of the filter and a height higher than that of the uneven wall in a direction toward the filter and enclosing the uneven wall,
   the filter is arranged apart from the uneven wall to form a space between the uneven wall, the filter, and the side wall, and fit inside the side wall, and
   the filter has a width larger than the outlet of the separator.

2. An oil separating device according to claim 1, wherein the uneven wall includes concave and convex portions arranged alternately to increase a surface area collided with the blow-by gas, and each of the concave and convex portions vertically continuously extends in a direction perpendicular to a flow direction of the blow-by gas.

* * * * *